April 24, 1945. E. E. WEST 2,374,571
BAG FEEDING, TURNING, AND DELIVERING MECHANISM
Filed Sept. 19, 1940 10 Sheets-Sheet 1
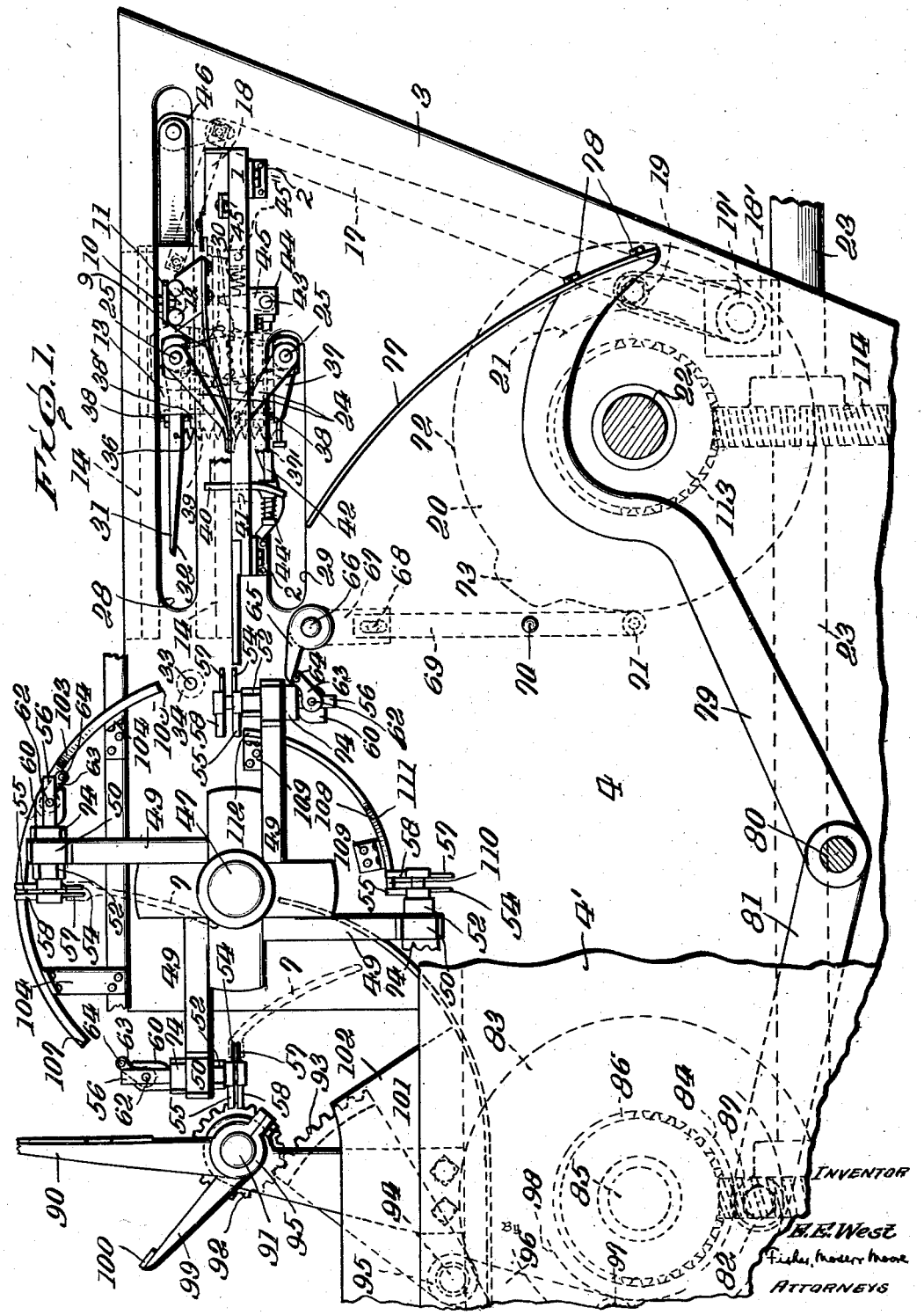
INVENTOR
E. E. West
ATTORNEYS

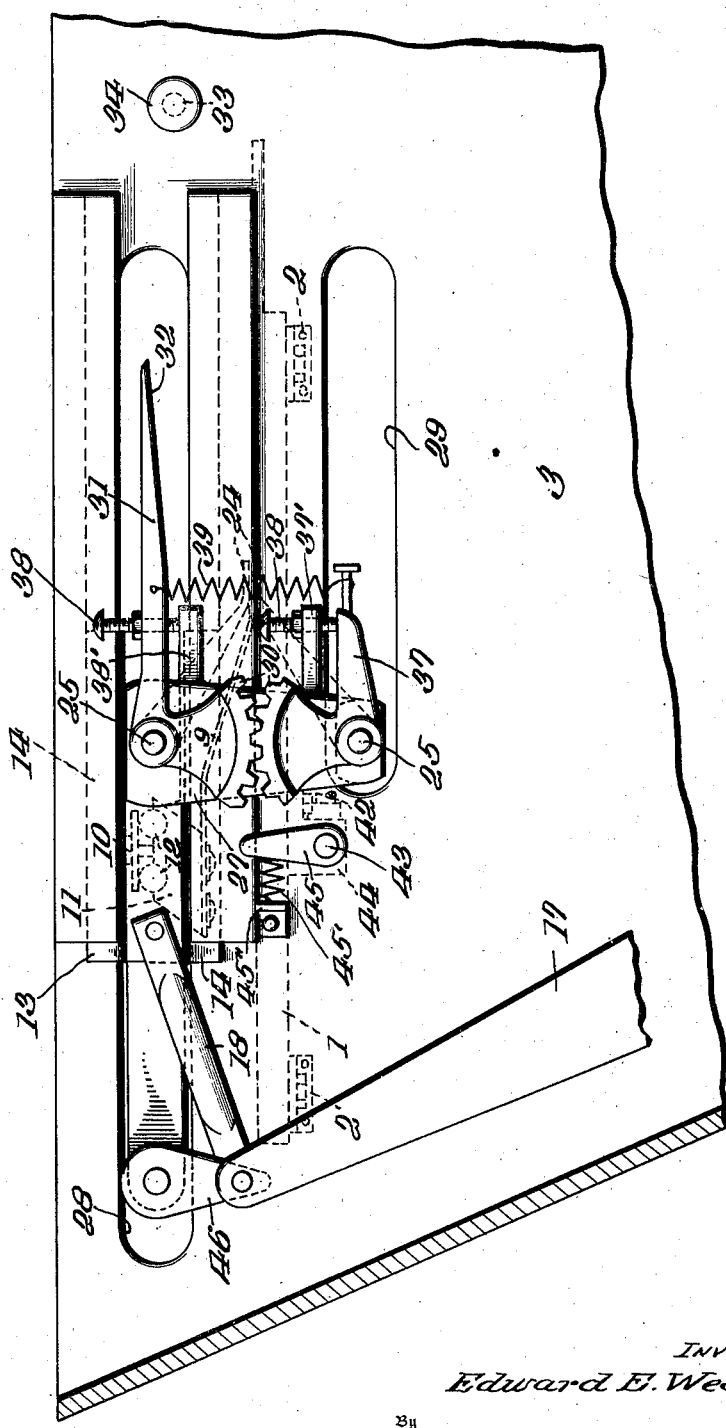

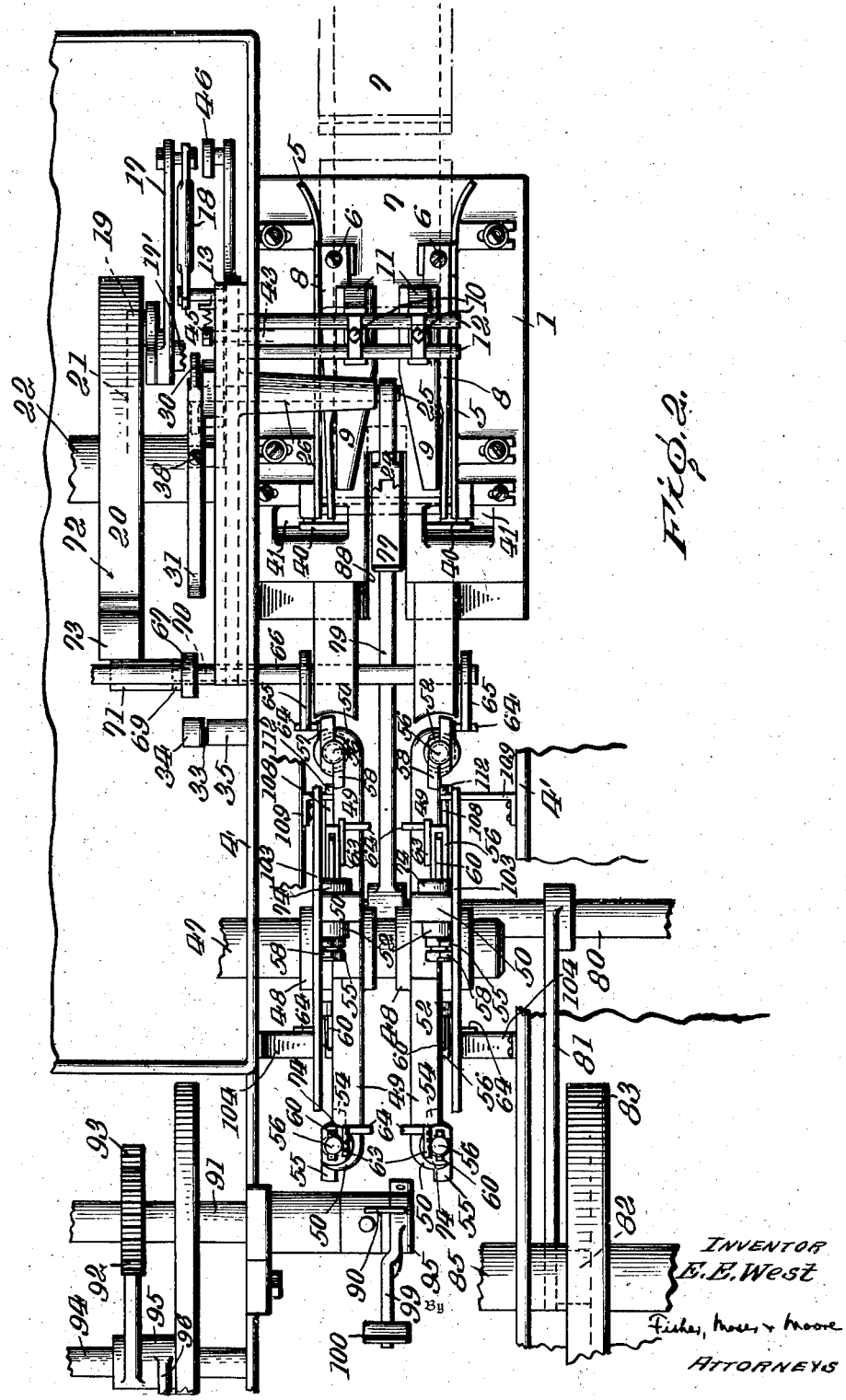

April 24, 1945. E. E. WEST 2,374,571
BAG FEEDING, TURNING, AND DELIVERING MECHANISM
Filed Sept. 19, 1940 10 Sheets-Sheet 4
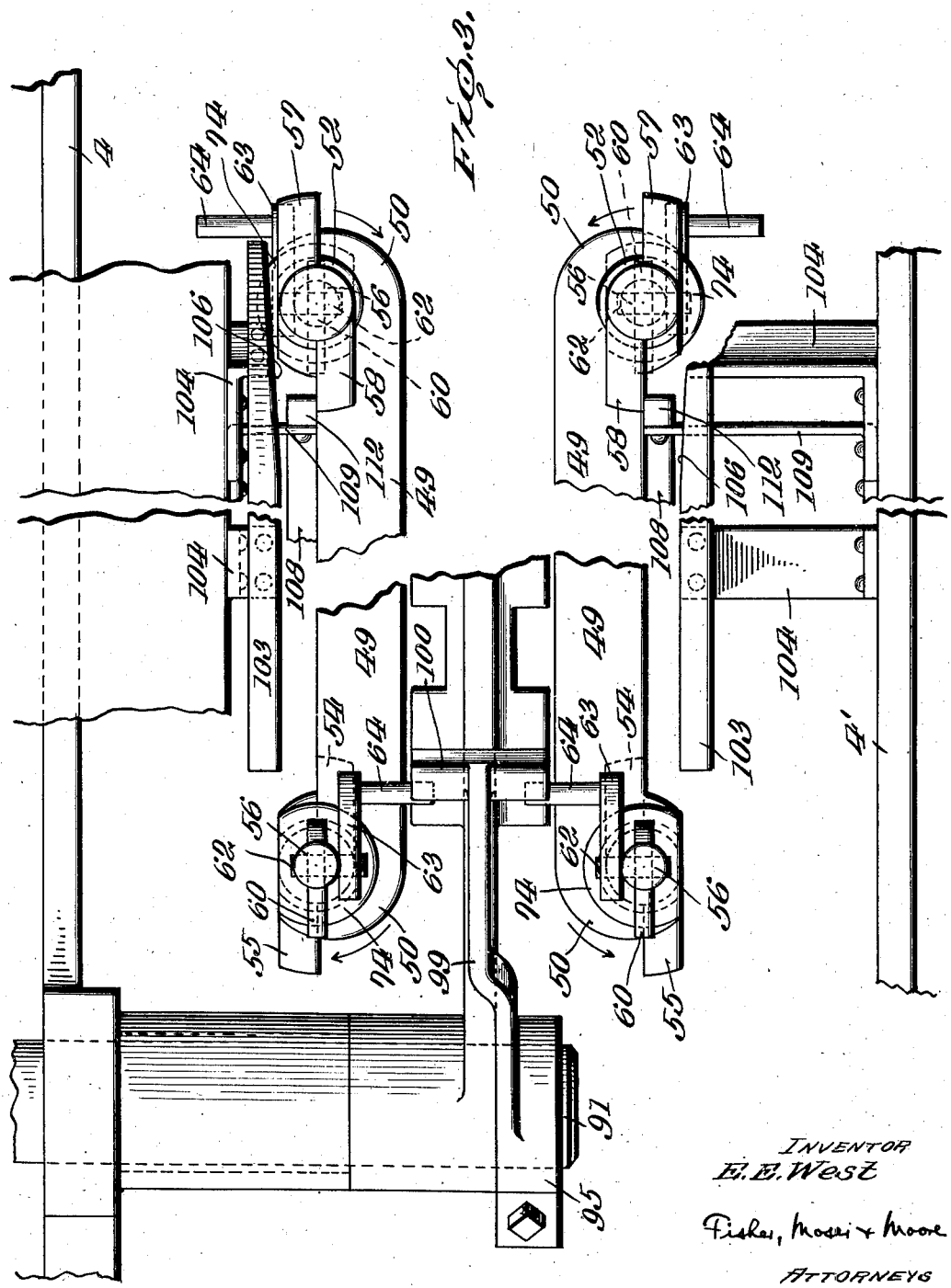
INVENTOR
E. E. West
Fisher, Moser + Moore
ATTORNEYS April 24, 1945. E. E. WEST 2,374,571
BAG FEEDING, TURNING, AND DELIVERING MECHANISM
Filed Sept. 19, 1940 10 Sheets-Sheet 5
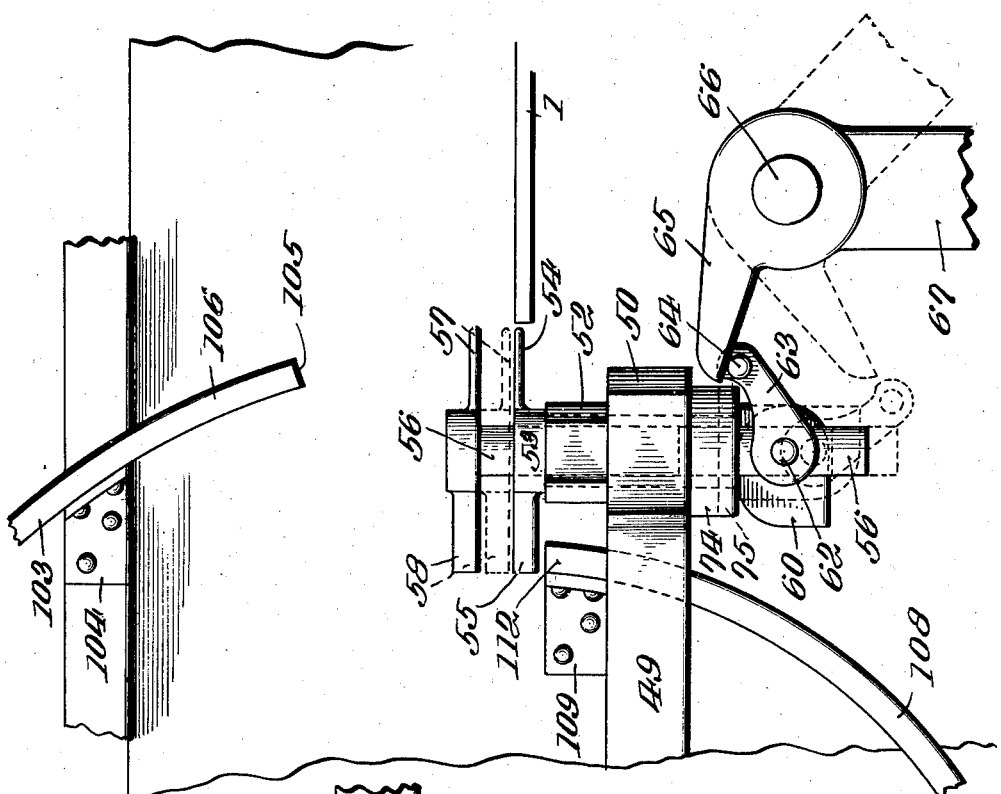
INVENTOR
E. E. West
Fisher, Moser + Moore
ATTORNEYS

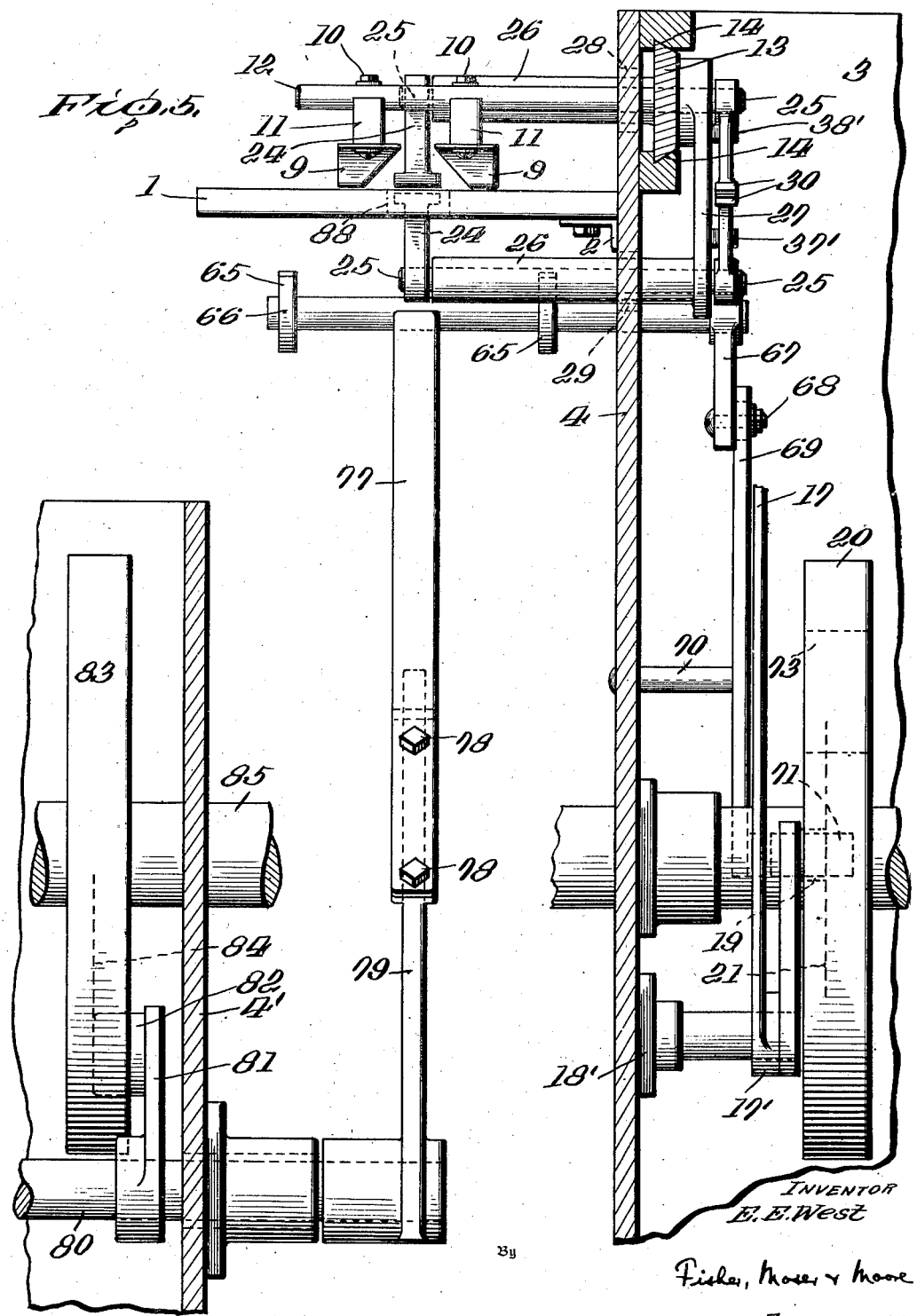

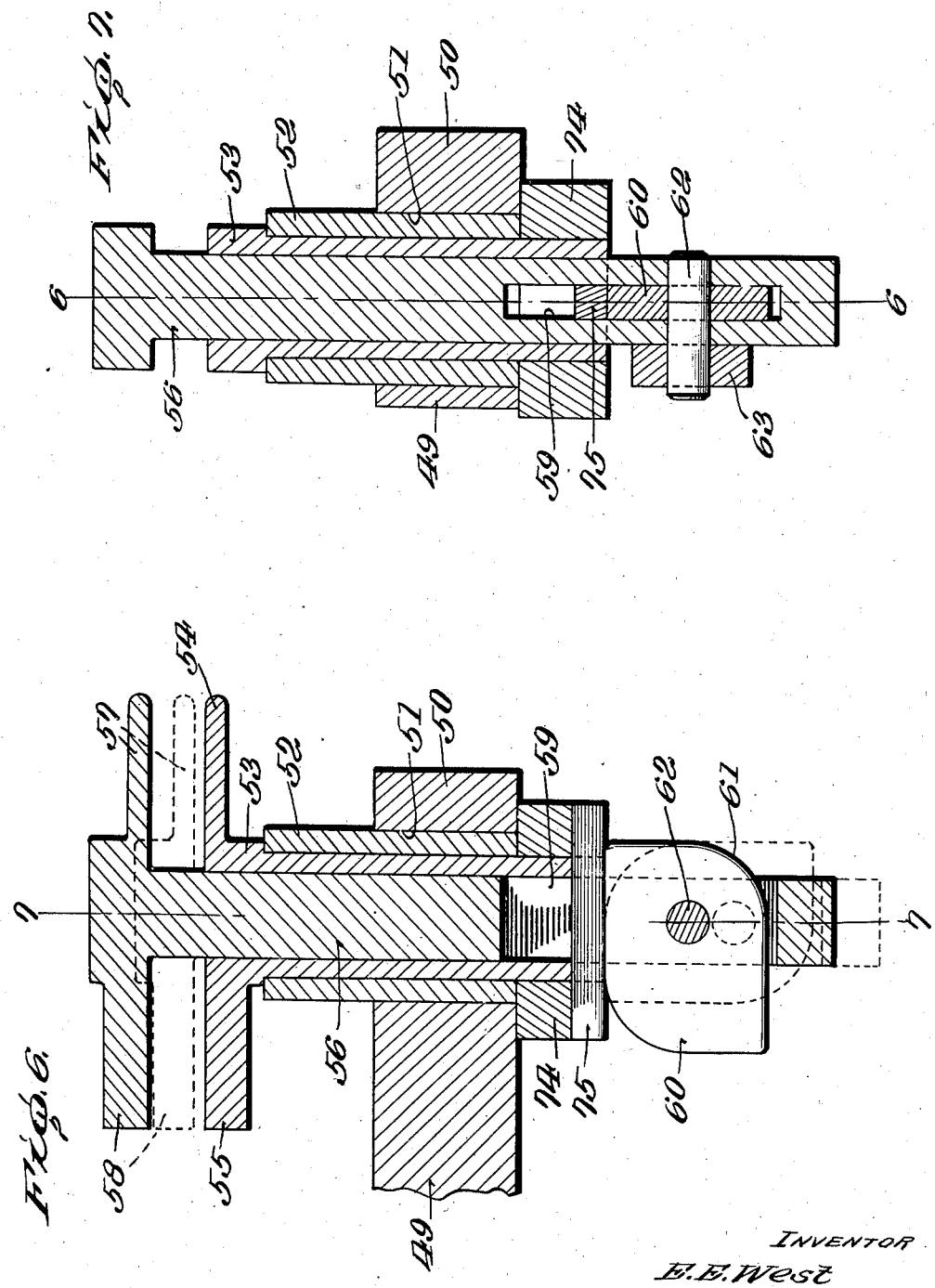

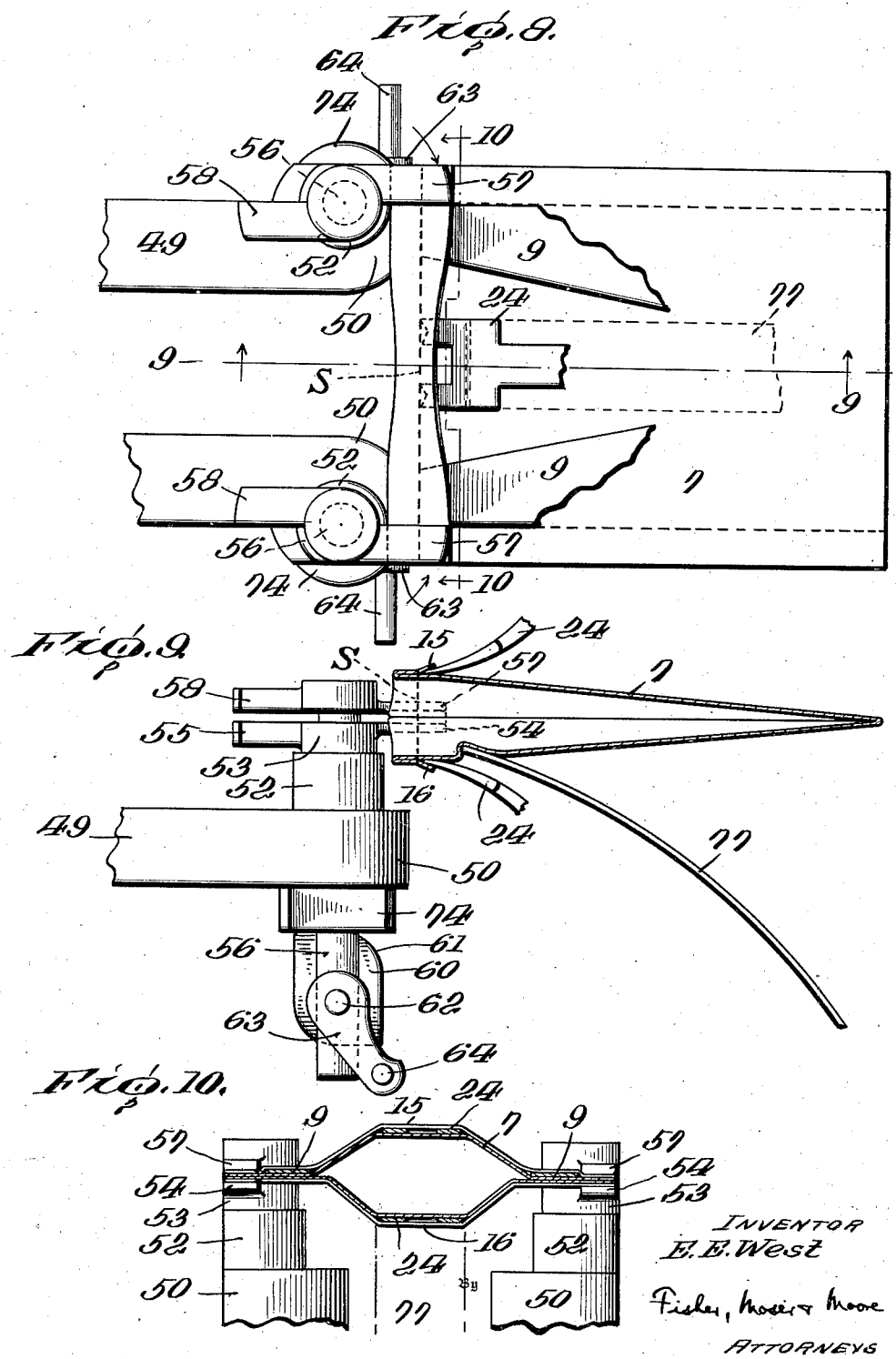

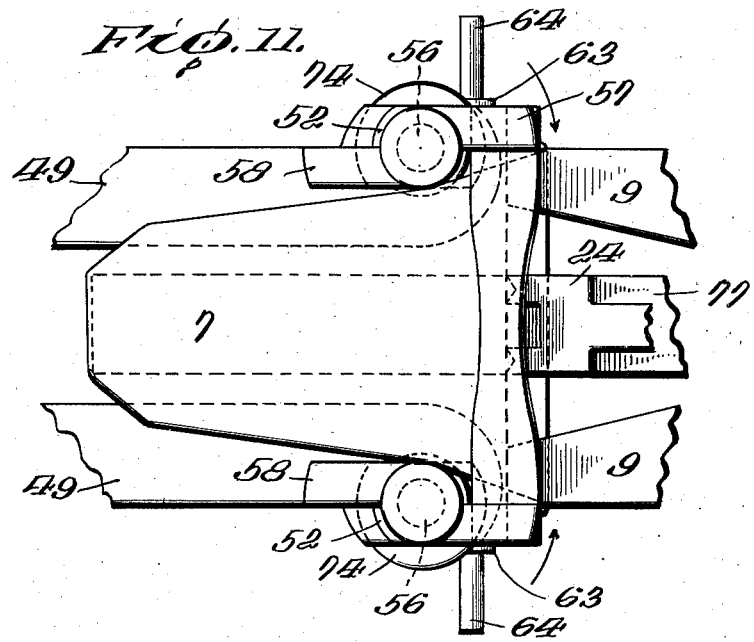
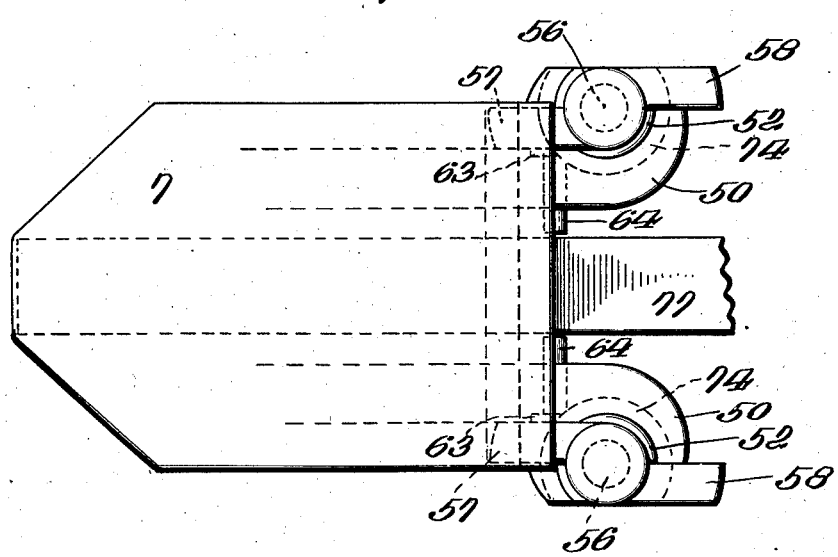

April 24, 1945.  E. E. WEST  2,374,571
BAG FEEDING, TURNING, AND DELIVERING MECHANISM
Filed Sept. 19, 1940  10 Sheets-Sheet 10

INVENTOR
E. E. West
By
Fisher, Moser & Moore
ATTORNEYS

Patented Apr. 24, 1945

2,374,571

UNITED STATES PATENT OFFICE 2,374,571

BAG FEEDING, TURNING, AND DELIVERING MECHANISM

Edward E. West, Richmond, Va.

Application September 19, 1940, Serial No. 357,457

37 Claims. (Cl. 112—2)

This invention relates to improvements in bag feeding, turning and delivering means for stringing machines.

The principal object of the present invention is the provision of improved means for horizontally feeding hemmed bags onto bag positioning and holding means and turning the bags right side out and delivering the same to a receptacle, the means shown herein being an improvement over the feeding and turning and delivering means of my Patent No. 2,274,622.

Another object is to provide an improved bag positioning and holding means having means associated therewith for turning a hemmed bag right side out to enable the bag hems to be strung on the outside, after being moved to stringing position.

Another object is the provision of an improved and simplified means for horizontally feeding hemmed bags onto bag positioning and holding means.

A further object is the provision of a bag positioning and holding means having means for gripping the bag during the turning thereof to enable the bag to be arranged right side out preparatory to being strung.

A further object is to provide improved means for removing the bags from the bag positioning and holding means, after the same have been strung, and delivering the same uniformly and in proper position into a receptacle.

A still further object is to provide means for supporting and turning a hemmed bag right side out, preparatory to being strung, to assure of the draw strings being inserted on the outside of the hems and prevent the same from being arranged on the inside of the bag.

These and other objects and advantages will be apparent as the specification is considered with the accompanying drawings, wherein:

Figure 1 is a side elevation of the bag feeding, supporting, turning and delivering mechanism and associated operating mechanism;

Figure 1a is an enlarged side elevation from the rear of Figure 1, showing the bag feeding and supporting mechanism and the associated operating mechanism;

Figure 2 is a plan view of the bag feeding, supporting, turning and delivering mechanism;

Figure 3 is a plan view of two pairs of the turret head arms and grippers, with the turret head omitted;

Figure 4 is a side elevation of one of the bag hem grippers and the mechanism for closing the same;

Figure 4a is a side elevation of one of the bag grippers and the mechanism for opening the same;

Figure 5 is an end view of the bag feeding and opening, and associated operating mechanism;

Figure 6 is a section through one of the bag hem grippers, along the line 6—6 of Figure 7;

Figure 7 is a section through one of the bag hem grippers, along the line 7—7 of Figure 6;

Figure 8 is a plan view of one pair of grippers and the bag pushing and bag opening fingers, in the positions they assume when a bag is gripped and opened preparatory to being turned right side out;

Figure 9 is a section along the line 9—9 of Figure 8;

Figure 10 is a section along the line 10—10 of Figure 8, showing the bag mouth in open and gripped position;

Figure 11 is a plan view of a bag and grippers in the positions they assume when the bag has been partially turned right side out by the turner member;

Figure 12 is a plan view of a bag and grippers in the positions they assume when the bag has been completely turned right side out by the turner member;

Figure 13:
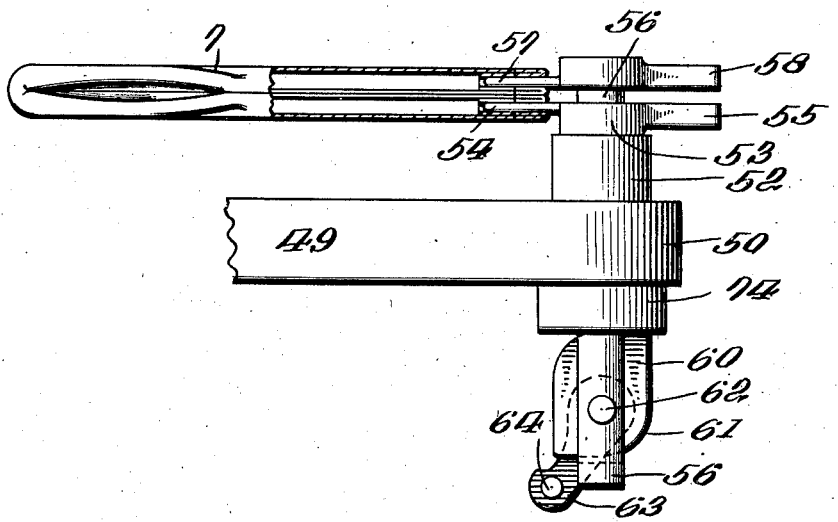
Figure 13 is a side elevation of the gripper and bag, with the bag partly broken away to show the gripper positioned therewithin, after the bag has been turned right side out.

Generally considered, hemmed bags are delivered, in chain connected form from a source of supply, to a horizontally disposed feeding and cutting mechanism which engages the hems of the successively fed bags, severs the connecting seam threads, and carries successive bags into one pair of horizontally disposed grippers, there being four radially extending pairs of gripping members mounted on a rotating turret head. The bags are then turned right side out preparatory to being operated upon by a stringing mechanism, which does not constitute a part of the present invention. After being strung, the bags are removed from the turret head grippers and are delivered to a receptacle.

Referring more particularly to the drawings, wherein like reference characters designate similar parts throughout the several views, the numeral 1 denotes a substantially flat, rectangular feed or transfer plate which is rigidly supported by L-shaped brackets 2, (see Figures 1 and 5), suitably secured to a side wall 4 of the main machine frame 3, of a stringing machine, only a portion of which is shown. A pair of spaced, longitudinally extending, bag guide runners 5, suitably secured by screws or the like 6 to the top face of the plate 1, cooperate with the plate to provide a guide or runway along which chain-connected, hemmed bag blanks 7 are fed from a source of supply, not shown. A pair of forwardly extending substantially flat, spaced, spring fingers 8, secured at their rear ends to the runners 5, rest lightly upon the top surfaces of the bag blanks 7 and serve to retain the same in proper alignment, as the bag blanks 7 are fed along the feed plate 1, between the runners 5.

The thread connected bag blanks 7 are pushed forwardly along the feed plate 1 by a pair of spaced, forwardly and downwardly extending, relatively flat, bag pusher fingers 9, secured by bolts 10 to a pair of blocks 11 carried by the outer ends of a pair of laterally extending rods 12, projecting through a longitudinal guide slot 28 in the side frame wall 4. The rods are fixedly mounted within a vertically disposed block 13, slidably arranged in a pair of spaced longitudinal guide tracks 14 suitably connected to the side frame wall 4. The fingers 9 extend underneath and into the top hem 15 of the bag blank 7 and engage the line of stitching S (see Figures 9 and 10), and the same are reciprocated forwardly relative to the stationary feed plate 1, to advance the bag blank thereon, by means of a vertical lever 17 pivotally connected, at its upper end, to an arm 18 in turn pivoted to the side of the block 13. Lever 17 is pivotally mounted, at its lower end, to a stub shaft 17' journalled in a bearing 18' on the main frame 3, and a roller 19, carried by lever 17, rides in a cam groove 21 in the face of a cam disk 20, mounted on a horizontal drive shaft 22. A gear 113, mounted on shaft 22 meshes with a gear 114, on a main longitudinal drive shaft 23. Rotation of the cam 20 actuates the lever 17 and reciprocates the block 13 in the guide track 14 whereby the pusher fingers 9 are moved forwardly on the feed plate 1, and thereby move or advance the foremost bag blank 7, of the chain of bags, intermittently beneath a pair of cutters, presently described.

A forwardly extending, relatively flat, bag opening finger 24 is secured to each inner end of a pair of top and bottom rock shafts 25 journalled in a pair of laterally extending bearings 26, carried by the block 13 and a downwardly depending arm 27 integrally formed thereon, as best illustrated in Figure 5. The bearings 26 extend through the guide slot 28 and a second guide slot 29 in the wall 4, beneath the feed plate 1. Fixed to the extended outer ends of the rock shafts 25 are a pair of segment gears 30, in mesh with each other, with the upper segment gear having a forwardly extending, substantially horizontally disposed, trip arm 31 suitably secured thereto. The arm 31 is provided with a beveled or forwardly and upwardly sloping bottom face 32 which is adapted to engage with and ride over a roller 34, carried by a laterally extending stub shaft 33, journalled in a bearing 35 secured to the side frame wall 4. Forward travel of the block 13, due to the rotation of the cam 20, causes the pair of pusher fingers 9 to enter into or underneath the top hem 15 and into engagement with the line of stitching S, and the opening fingers 24 to enter into the top and bottom hems 15 and 16 and to engage the stitching S. During the forward movement of the block 13, the beveled face 32 of arm 31 slides over the roller 34 thereby raising or elevating the arm 31, and rocking the top rock shaft 25 and segment gear 30 in a clockwise direction, viewing Figure 1, which in turn rocks the lower segment gear 30 and rock shaft 25 in an opposing or counter-clockwise direction. The trip arm 31 is preferably raised or elevated against the tension of a coil spring 36, connected to the arm and to a lug 37 on the lower segment gear 30. Thus, after the bag has been removed from the pusher and opening fingers 9 and 24, respectively, and, during the rearward travel of the block 13 within the guide track 14, the arm 31 will ride off the roller 34 and the tension of the spring 36 will serve to return the trip arm and segment gears 30 to their normal positions, as best shown in Figure 1. It is also preferable to provide stop pins or screws 38, extending through the trip arm 31 and a forwardly extending finger 37' secured to the arm 27. The top and bottom stop pins 38 are respectively adapted to engage with or abut a forwardly extending finger 38', secured to the upper end of the arm 27, and with the lower segment gear lug 37, to limit the downward movement of the trip arm 31 and the bottom segment gear 30, respectively, in an obvious manner. During the forward travel of the block 13 in the guide tracks 14, the bag pusher fingers 9, and the pushing and opening fingers 24 having been inserted within the hem 15, push the bag forwardly along the feed plate 1 and advance the hemmed mouth thereof into a pair of grippers 54—57, mounted on a rotating turret head, presently described. By virtue of the fact that the fingers 9 and 24 engage the straight line of stitching S, the bag hem is accurately aligned, with respect to the grippers, for the subsequent stringing operation and while the bag is gripped and supported thereby. The bag opening fingers 24, having been inserted in the top and bottom hems 15 and 16, are moved in opposing directions by the rock shafts 25, as hereinbefore described, to expand or open the mouth of the bag, after the same has been gripped or clamped by the turret head grippers 54—57, so that the bag may be turned right side out, as hereinafter described, preparatory to being strung.

As the foremost bag blank 7 of the chain of bags is being advanced along the feed plate 1, by the pusher fingers 9, it is necessary to sever the connecting bag threads. Thus, a pair of substantially L-shaped bag cutters 40, extend upwardly and are vertically movable through guide slots 41, in the feed plate 1, adjacent the forward ends of the bag guide runners 5, and are pivotally connected to the forward ends of a pair of rods 42. These rods are fixed at their rear ends to a rock shaft 43, in turn journalled in suitable blocks 44, secured to the underside of plate 1. The cutters 40 are provided with suitable cutting edges, not shown, so that when the rock shaft 43 and rods 42 are rocked downwardly, the cutters 40 are likewise moved downwardly through the guide slots 41, until their respective cutting edges coact with cutting edges, not shown, on the upper ends of the slots 41 and thereby shear or sever the connecting bag threads. Two coil springs 44', on the forward ends of the rods 42, engage the faces of the blades 40 and maintain the same in vertical alignment with respect to the slots 41, thus assuring of an accurate cutting or shearing contact between the respective cutting edges.

The rock shaft 43 extends through an opening in the side wall 4 of the machine frame and carries a small upstanding cam lug 45 on the inner end thereof, which is connected to a bracket 45", on the side wall 4, by a tension spring 45'. The spring serves to return the rods 42 and cutters 40 to their normal elevated position, after the cutting action has been performed. A trip finger 46, pivotally connected to the side of the sliding block 13 is adapted to slip or slide over the upper end of the rock shaft cam lug 45, during the rearward travel of the block. On the forward travel of the block 13, the trip finger 46 engages with the cam lug 45 and rotates the same, in a counter-clockwise direction, viewing Figure 1, against the tension of spring 45', so that the rock shaft 43 and rods 42 are rocked downwardly, through the slots 41, to sever the connecting bag threads. The cutting operation, just described, is substantially the same as that described and illustrated in my copending application, Serial No. 357,458, filed September 10, 1940. It should be noted that the bag pusher fingers 9 and opening fingers 24 enter the top and bottom hems 15—16 of the bag 7, while the latter is stationary on the feed plate 1, with the hems to the rear of the cutters 40, and that the cutting of the threads occurs as the bag is in motion, that is, being pushed forwardly. When the connecting bag threads have been severed, the pusher fingers 9 deliver the foremost bag to the gripping means 54—57 on the rotating turret head, hereinafter described, which serves to grip and support the bag in position while the same is being turned right side out. The turret head then successively rotates the bag to a vertical stringing station, and thence to a horizontal station where the strung bag is removed therefrom and delivered to a hopper 101. The turret head is intermittently rotated, to carry the bag gripping arms to the various stations, by any suitable means such as a Geneva movement, not shown, corresponding in structure with the Geneva mechanism of my pending application Serial No. 250,223, filed January 10, 1939.

The bag holding turret head comprises a shaft 47, journalled in the spaced side walls 4—4' of the machine frame. A pair of sleeves 48 are mounted upon and keyed to the shaft 47, each of the sleeves being provided with four stub arms 49, arranged in pairs, that is, oppositely disposed arms in the respective sleeves constitute a pair. The outer ends of the arms 49 are rounded or enlarged, as at 50, and bores 51 extend therethrough, within which are fixedly mounted bushings or sleeves 52, as best shown in Figures 6 and 7. A tube 53, sleeved within each of the bushings 52, is formed with a laterally and rearwardly extending jaw or finger 54 and a tail 55 on the upper end thereof, and a rod 56, having a corresponding laterally and rearwardly extending jaw or finger 57 and tail 58 formed on its upper end, is frictionally sleeved within the tube 53. The extended lower end of the rod 56 is slotted, as at 59, to accommodate a relatively small cam 60, having a curved portion 61 thereon, which cam is carried by a pin 62 journalled in the rod 56. Formed on the pin 62 is a rearwardly and upwardly extending lug 63, having a pin 64 on the outer or free end thereof.

The pins 64 are adapted to be engaged by a pair of spaced trip arms 65, carried by a horizontal rock shaft 66 journalled in the side walls 4—4' of the machine frame. The rock shaft 66 is rocked by a downwardly depending link 67 pivoted, as at 68, to the upper end of a vertically disposed lever 69, in turn pivoted intermediate its ends, as at 70, to the side wall 4 of the frame. A roller 71, on the lower end of lever 69, rides on the periphery 72 of the cam disk 20, on the horizontal drive shaft 22, and is adapted to be engaged by a hump 73 thereon, so that, upon clockwise rotation of the cam, viewing Figure 1, the lower end of lever 69 is rocked in a corresponding direction. Thus, the shaft 66 is rocked in an opposing or counter-clockwise direction causing the trip arms 65 to move downwardly into actuating engagement with the pins 64 and lugs 63. As the members 64 and 63 are forced downwardly the cams 60 are rocked in a clockwise direction, causing the curved portions 61 thereon to bear against and frictionally engage the undersides of keys 75, carried by bearings 74, mounted on the lower ends of the gripper tubes 53, and extending laterally through the slots 59 in the gripper rods 56. The rotation of the cams 60 serves to pull or draw the gripper rods 56, from the full line position of Figure 6, downwardly frictionally through the gripper tubes 53, to the dotted line position of Figure 6, whereby the top gripping jaws 57 are moved to closed gripping position, relative to the bottom gripping jaws 54. If desired, supplemental means, such as springs, not shown, may be fastened to the upper ends of the rods 56 and to the next adjacent pairs of stub arms 49, which springs serve to assist in retaining the top gripping jaws 57 in raised or open positions. The pairs of gripping jaws 54 and 57 are thus caused to engage with and grip the sides of the top and bottom bag hems 15 and 16, as best shown in Figures 8 to 10. With the bag hems in this gripped position, the bag opening fingers 24 are expanded to open the mouth of the bag, as shown in Figures 8 to 10, to permit of the bag being turned right side out, as presently described.

With an opened bag being gripped and supported in substantially a horizontal position, by the pairs of gripping jaws 54—57, the bag is engaged by a curved turner member or plate 77. The turner member 77 is secured, by bolts or the like 78, to the curved upper end of a lever 79 which is fixed, at its lower end, to a horizontal stub shaft 80, in turn journalled in the side wall 4' of the machine frame. An arm 81, carried by the shaft 80, is provided with a roller 82, on the outer end thereof, which rides in a cam groove 84 in the face of a cam disk 83 mounted on a horizontal drive shaft 85, journalled in the machine frame. The shaft 85 and cam 83 are rotated in a clockwise direction, viewing Figure 1, by means of a skew gear 86, on one end of the shaft, meshing with a skew gear 87 on the outer end of the main longitudinal drive shaft 23. Rotation of the cam 83 depresses the roller 82 and arm 81, thereby rocking shaft 80, lever 79 and turner 77 in an opposing or counter-clockwise direction, and swinging the turner upwardly and forwardly in an arc. The upper end of the turner member 77 is thereby moved upwardly through a longitudinal slot 88 in the forward end of the feed plate 1, as shown in Figure 2, into engagement with the bottom face of the gripped bag, to the rear of the bottom hem 16 and intermediate the pairs of side hem gripping jaws 54—57 as best shown in Figure 9. Continued upward travel of the member 77 causes the bottom face of the bag 7 to be pushed forwardly through the mouth of the bag, which is expanded or opened by the pair of bag opening fingers 24. As the turner member pulls the closed or bottom end of the bag through the open mouth thereof, the hems 15—16 will be pulled off the pairs of pushing and opening fingers 9 and 24, respectively, and the bag will be pulled or stretched to the position shown in Figure 11. The continued forward movement of the turner results in a pull being exerted on the gripping jaws 54—57 by the bag whereby the tubes 53, with the rods 56 sleeved therewithin, are rotated in opposed directions, that is, counterclockwise and clockwise, respectively, viewing Figure 11. The gripping jaws 54—57 are thus swung inwardly and forwardly until the same are disposed on the inside of the turned bag, adjacent to and substantially parallel with the turret arms 49, with the tails 55—58 of the jaws projecting rearwardly of the turret arms, in the Figure 12 position. In other words, the turner member turns the bag right side out and, through the medium of the pull exerted by the bag itself, also reverses the hem gripping jaws, from their normal extended positions to the rear of the turret arms, to positions within the bag.

Figure 14:
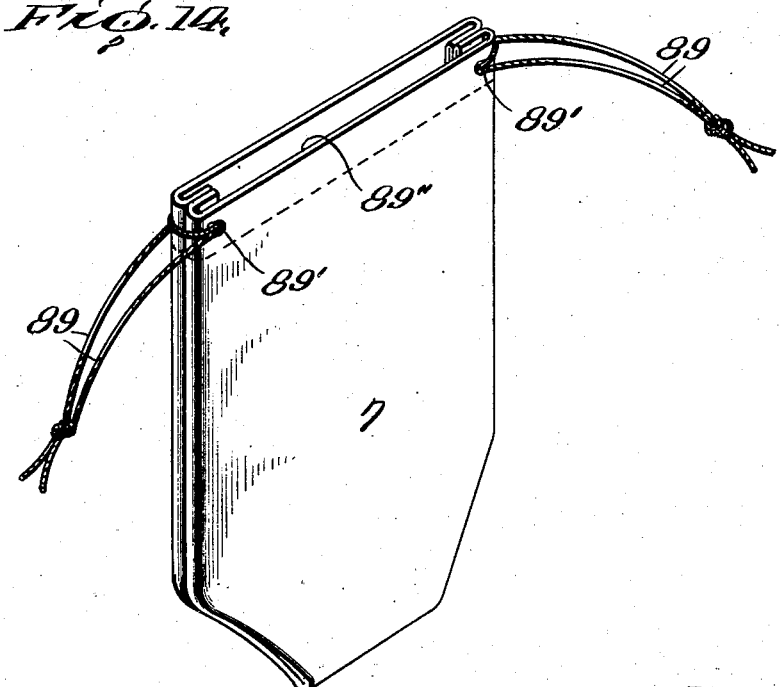
Figure 14 is a perspective view of the completely turned and strung bag.

After a bag has been gripped by the jaws 54—57 and turned right side out by the turner member 77, the turret head is rotated, approximately one quarter of a revolution, in any desired manner such as that described in my Patent No. 2,274,622, to move the turret arms 49, with a bag supported thereon, from the horizontal feeding to a vertical stringing station. Thus, the bag is suspended or caused to hang downwardly between the arms 49, as best shown in Figure 1. In this position the hems are in alignment with a pair of suitable stringing needles, not shown, which are adapted to carry a pair of draw strings 89, through the hems (see Fig. 14). Due to the bag being turned right side out, before being moved to the stringing station, the needles enter into the outer face of and pass through the hems on the outside thereof. This is particularly advantageous and desirable because the openings 89' formed by the needles in the ends of the hems, are below and spaced from the marginal edges 89" of the bag mouth so that the ends of the draw strings, projecting therethrough, dangle or hang down the outside of the bag, as illustrated in Figure 14.. Consequently, the bags may be readily filled with tobacco or the like with little danger of the strings being accidentally forced into the bag, which necessitates removal of the strings by the operator with a resulting loss of time and tobacco.

Upon completion of the stringing operation, the turret head is further rotated one quarter of a revolution to move the turret arms and strung bag to a horizontal releasing and removing station. It is now necessary to open the gripping jaws 54—57 to permit of the removal of the bag therefrom and the delivery of the same into a hopper 101. To this end, a vertically disposed paddle or arm 90 is fixedly secured to a stub shaft 91, journalled in the side frame wall 4. The outer end of the shaft 91 carries a gear 92 which meshes with and is rocked by a segment gear 93, mounted on a bearing 95 carried by a rock shaft 94, in turn journalled in the side frame wall 4. A downwardly depending lever 96, fixed to the bearing 95, carries a cam roller 97 on the lower end thereof which travels in a cam groove 98 in the side of the cam disk 83, on the horizontal drive shaft 85. Rotation of the shaft 85 and cam 83, in a clockwise direction, viewing Figure 1, swings the segment gear 93 in the opposing or counterclockwise direction, which in turn rotates the shaft 91 and paddle 90, in a clockwise direction. The paddle 90 is thereby rocked downwardly, in an arc, from a vertical to a substantially horizontal position where the same engages the topmost side of the bag.

At this position, the gripper jaws 54—57 are opened, to release the side edges of the bag hems, by means of a vertically and rearwardly extending arm 99, carried by the rock shaft 91. The arm 99 is arranged on the shaft 91 at the rear of and at approximately a forty five degree angle relative to the paddle 90, so that, when the paddle is rocked downwardly to the horizontal bag engaging position, the arm 99 will be simultaneously rocked forwardly until a flat face 100, on the upper end thereof, abuts the laterally extending pins 64 on the lugs 63. Continued downward movement of the arm 99 in a clockwise direction, viewing Figure 4, rocks the lugs 63 and 60 in a corresponding direction, so that the curved portions 61 on the cams bear against the keys 75, in the slotted bearings 74 on the lower ends of the gripper tubes 53. By virtue of this movement of the cams 60, the rods 56, viewing Figure 4a, are forced downwardly, through the tubes 53, thus moving the top gripper jaws 57 to the dotted line position of Figure 4a and out of gripping engagement with the bottom gripper jaws 54. In this manner the gripper jaws 54—57 are opened and release their grip on the side edges of the bag hems. As the paddle 90 extends longitudinally of and engages the bag 7, and the gripping jaws are opened or released continued movement of the paddle 90 carries the bag downwardly and forwardly, in an arc, between the bag gripping arms 49. The bag is then pulled out of the opened gripping jaws 54—57 and is pushed in a substantially vertical position into the open inner end 102 of a horizontally disposed, longitudinal, bag hopper or container 101, suitably supported on the machine frame 3. When the bag is pulled out of the open gripping jaws 54—57, a pull will be exerted by the bag on the jaws thus causing the same to swing forwardly and outwardly in opposing directions, that is, clockwise and counterclockwise, respectively, in the direction of the arrows Figure 3, until the pairs of jaws 54—57 resume their normal extended positions relative to the ends of the turret arms 49. Rotation of the bag holding stub arms 49 to the horizontal bag gripping station, moves the gripping jaws to the necessary open position to receive another bag blank, as the same is fed thereinto by the bag pusher fingers 9.

Prior to the gripper jaws and turned bag being elevated to the vertical feeding station, it is essential that the jaws be arranged within the bag substantially parallel to and adjacent the sides of the bag and arms. Unless this is done, the jaws may not accurately and uniformly support the ends of the hems and align the same with the stringing needles, resulting in the needles missing the hems or otherwise failing to properly string the same. As previously described, the turning of the bag right side out, by the turner 77, swings the closed gripper jaws 54—57 inwardly so that they are disposed within the turned bag, leaving the tails or extended ends 55 and 58 thereof projecting beyond the ends of the bag. However, additional means must be provided for further moving the jaws into parallel positions relative to the turret arms. This is accomplished by means of cam rings 103, secured to the inner faces of the side frame walls 4—4' by suitable brackets 104. These rings 103 extend through an arc, beginning at a point above and substantially in alignment with the extended ends of the gripper jaw tails 55 and terminating at a point above the lower ends of the gripper tubes 53, in the position they assume in the horizontal bag removing station. During the rotation of the turret arms 49, from the horizontal feeding to the vertical stringing station, the tails 55 of the jaws will engage with the lower ends 105, of the cam rings 103, and ride upwardly along the tapered or beveled faces 106 thereof. The tails 55 are therefore forced inwardly, in opposed directions, which in turn swings the pairs of jaws 54—57 outwardly, into alignment with the outer side edges of the turret arms. Due to this movement of the jaws, the hemmed mouth end of the bag is stretched and, as the tails ride upwardly over the cams 103, the jaws are held or locked in position and accurately and uniformly support and align the hems with the stringing needles, throughout the stringing position. As the turret arms continue to rotate, from the vertical stringing to the horizontal bag removing station, the tails 55 ride off the upper ends 107 of the cams so that, when the jaws reach their bag removing positions, the same may be freely opened. After the hemmed bag has been removed from the opened jaws, the arms continue to rotate to a downwardly depending vertical position and thence to the horizontal feeding station. A second pair of substantially arcuately shaped, cam rings 108 are secured, by brackets 109, to the side frame walls 4—4' below and spaced from the cam rings 103. During the rotation of the turret arms, just described, the tails 55 of the jaws engage the lower ends 110 of the cams 108 and ride upwardly along the tapered or beveled faces 111 thereof. The cams deflect the tails outwardly and force the jaws inwardly so that the latter extend rearwardly and substantially parallel to each other, in position to assure of them receiving and gripping the ends of the hems of another bag. As the arms reach the horizontal feeding station, the tails 55 ride off the upper ends 112 of the cams and release the jaws whereby the latter are adapted to be rotated, during the turning of another bag, as hereinbefore described.

What I claim is:

1. A machine of the character described including a frame and comprising a rotatable bag holder having rotatable bag gripping jaws thereon, a substantially horizontally disposed reciprocating bag feeding carriage for feeding hemmed bags horizontally into said gripping jaws, and cam means carried by said jaws, means engageable with said cam means for actuating the jaws to closed gripping position on the hems of a bag for supporting and positioning the bag for stringing, and oscillating means pivoted to said frame movable arcuately between said rotatable gripping jaws and engageable with said substantially horizontally disposed bag for turning said bag right side out and rotating said gripping jaws on said bag holder preliminary to stringing the same.

2. A machine of the character described including a frame and comprising a rotatable bag holder having rotatable bag gripping jaws thereon, a substantially horizontally disposed reciprocating bag feeding carriage for feeding hemmed bags horizontally into said gripping jaws, cam means carried by said jaws, and means engageable with said cam means for actuating the jaws to closed gripping position on the hems of a bag for supporting and positioning the bag for stringing, an upstanding arm member pivotally mounted on said frame and means for oscillating said member arcuately between said rotatable gripping jaws and into engagement with said substantially horizontally disposed bag whereby the end of the bag is moved through the mouth thereof and turned right side out and said jaws are rotated preliminary to stringing the same.

3. A machine of the character described including a frame and comprising a bag holder having substantially vertically movable bag gripping means thereon for supporting and positioning a bag for stringing, a substantially horizontally disposed bag feeding carriage for feeding hemmed bags into the gripping means on said bag holder, cam means on said gripping means and means engageable with said cam means for moving the same and said gripping means to grip the bag, and means pivotally mounted on said frame and arcuately movable between said movable gripping means and engageable with said bag for turning the bag right side out preliminary to stringing the same, and means engageable with said cam means for opening said gripping means and releasing said bag therefrom after the stringing thereof.

4. A machine of the character described including a frame and comprising a rotatable bag holder having substantially vertically movable bag gripping jaws rotatably mounted thereon for supporting and positioning a bag for stringing, a substantially horizontally disposed bag feeding carriage for feeding hemmed bags horizontally into the gripping jaws, cam means on said jaws and means engageable with said cam means for moving the same and said jaws to closed gripping position on the bag hems, and oscillating means pivotally mounted on said frame and arcuately movable between said gripping jaws and engageable with said bag for turning the bag right side out and rotating said jaws preliminary to stringing the same, oscillating means engageable with the cam means on said gripping jaws for opening the same, and means engageable with said bag for moving the bag out of said jaws after the stringing thereof.

5. A machine of the character described including a frame and comprising a rotatable bag holder having bag gripping jaws thereon for supporting and positioning a bag for stringing, a substantially horizontally disposed bag feeding carriage for feeding hemmed bags horizontally into the gripping jaws, cam means on said jaws and means engageable with said cam means for moving the jaws to closed gripping position on the ends of the bag hems, and oscillating means pivotally mounted on said frame and arcuately movable between said gripping jaws and engageable with one face of said substantially horizontally disposed bag for turning the bag right side out preliminary to being strung, oscillating means engageable with the cam means on said gripping jaws for opening the same, and oscillating means engageable with said strung bag for moving the bag out of said jaws.

6. A machine of the character described comprising a bag holder having substantially vertically movable bag gripping jaws thereon for supporting and positioning a hemmed bag for stringing, means on said jaws and trip members engageable with said means for vertically moving and closing said jaws on the hems of a bag preliminary to stringing said bag, an upstanding member pivotally mounted adjacent said bag holder having means thereon for engaging the means on said gripping jaws, and an upstanding arm associated with said member, and means for oscillating said member and arm into engagement with said gripping jaws and hemmed bag, respectively, for vertically moving and releasing said jaws and removing the bag from the opened jaws after said bag has been strung.

7. A machine of the character described comprising a bag holder having substantially vertically movable bag gripping jaws rotatably mounted thereon for supporting and positioning a bag for stringing, a substantially horizontally disposed bag feeding carriage for horizontally feeding hemmed bags into the gripping jaws, means on said jaws, and trip members engageable with said means for vertically moving the gripping jaws to closed gripping position on the bag hems, and substantially vertical means movable between said gripping jaws and engageable with said bag for turning the bag right side out and rotating the jaws on said bag holder preparatory to stringing the bag, means engageable with said gripping jaws and bag for opening the jaws and releasing the bag therefrom after the stringing thereof, and means engageable with said jaws for arranging the jaws in bag gripping and releasing positions.

8. A machine of the character described comprising a bag holder having bag gripping jaws mounted thereon for supporting and positioning a bag for stringing, a substantially horizontally disposed bag feeding carriage for feeding hemmed bags into the gripping jaws, cam means engageable with said gripping jaws, and means engageable with said cam means for moving the cam means on said jaws to closed gripping position on the bag hems, and means movable between said gripping jaws and engageable with said substantially horizontally disposed bag for turning the bag right side out and rotating the jaws on said bag holder preparatory to stringing the bag, means engageable with said gripping jaws and bag for opening the jaws and releasing the bag therefrom, and cam means engaging with the jaws for arranging the jaws in bag gripping and releasing positions.

9. A machine of the character described comprising a bag holder having bag gripping jaws mounted thereon for supporting and positioning a bag for stringing, a substantially horizontally disposed bag feeding carriage for feeding hemmed bags into the gripping jaws, cam means engageable with said gripping jaws, and means engageable with said cam means for moving the cam means and said jaws to closed gripping position on the ends of the bag hems, and means movable between said gripping jaws and engageable with said substantially horizontally disposed bag for turning the bag right side out and rotating the jaws on said bag holder preparatory to stringing the bag, means engageable with said cam means and bag for opening the jaws and releasing the bag therefrom after the stringing thereof, and substantially vertically disposed cam tracks engaging with the sides of said jaws for automatically aligning and retaining the jaws in bag gripping and releasing positions.

10. A machine of the character described including a frame and comprising a bag holder having gripping means movably mounted thereon for supporting and positioning a bag for stringing, horizontally disposed means for horizontally feeding hemmed bags into said gripping means, and means pivotally mounted on said frame and movable vertically into engagement with said substantially horizontally disposed bag for turning said bag right side out and for moving said gripping means relative to said bag holder and to a position within the bag to facilitate said turning operation.

11. A machine of the character described including a frame and comprising a bag holder, gripping means rotatably mounted on said bag holder for gripping the hems of and supporting a bag for stringing, horizontally disposed means for horizontally feeding hemmed bags into said rotatable gripping means, and means pivotally mounted on said frame and arcuately movable to engage with said substantially horizontally disposed bag for turning the bag right side out on said bag holder, and for rotating said gripping means relative to said bag holder to a position within the bag to facilitate said turning operation.

12. A machine of the character described comprising a rotatable bag holder having pairs of bag gripping jaws mounted thereon, a substantially horizontally disposed bag feeding carriage, means for reciprocating said carriage for feeding hemmed bags horizontally into said gripping jaws, and a pair of fingers pivotally mounted on said carriage adapted to extend into the hems of and to open the mouth of a bag, and trip means engageable with each of said jaws for actuating the same to closed gripping position on the ends of the bag hems for supporting the bag, an upstanding substantially curved arm member mounted below said bag holder and means for oscillating said member substantially arcuately between said gripping jaws and into engagement with said bag whereby the end of the bag is moved through the mouth thereof and turned right side out preliminary to being strung.

13. A machine of the character described comprising a rotatable bag holder having pairs of bag gripping jaws sleeved and rotatably mounted thereon, a substantially horizontally disposed bag feeding carriage, means for reciprocating said carriage for feeding hemmed bags horizontally into said gripping jaws, and a pair of fingers pivotally mounted on said carriage adapted to extend into the hems of and to open the mouth of a bag, movable cam means carried by said jaws and trip means engageable with said cam means for moving the same and actuating the jaws to closed gripping position on the ends of the bag hems for supporting the bag substantially horizontally, an upstanding substantially curved arm member mounted below said bag holder and means for oscillating said member substantially arcuately between said jaws and into engagement with said substantially horizontally disposed bag whereby the closed end of the bag is moved through the mouth thereof and turned right side out preliminary to being strung.

14. A machine of the character described including a frame and comprising a rotatable bag holder having pairs of sleeved tubular members rotatably mounted thereon, pairs of gripping jaws on one end of said tubular members for gripping the hems and supporting a bag for stringing, a substantially horizontally disposed means for horizontally feeding hemmed bags into said gripping jaws, cam members mounted on one end of said tubular members and trip members engageable with and rotating said cam members for moving said sleeved tubular members and said jaws to closed gripping position on the ends of the bag hems for substantially horizontally supporting the bag, and means movably mounted on said frame and movable relative to said bag holder for engaging said substantially horizontally disposed bag and turning the bag right side out and for rotating the gripping jaws relative to the bag holder to a position within the bag to facilitate the stringing of the bag.

15. A machine of the character described comprising a rotatable bag holder having pairs of sleeved tubular members rotatably mounted thereon, pairs of laterally extending gripping jaws on the upper ends of said tubular members for gripping the ends of the hems and supporting a bag for stringing, a substantially horizontally disposed bag feeding carriage for horizontally feeding hemmed bags into said gripping jaws, cams mounted on the lower end of said tubular members and trip members engageable with and rotating said cam members for moving said tubular members and said jaws vertically to closed gripping position on the ends of the bag hems for substantially horizontally supporting the bag, an upstanding curved member pivotally mounted below said bag holder and means for moving said member arcuately between said tubular members and into engagement with said substantially horizontally disposed bag whereby said bag is turned right side out and said gripping jaws are rotated relative to the bag holder to a position within the bag to facilitate the stringing of the bag.

16. A machine of the character described including a frame and comprising a bag holder having movable gripping means thereon for supporting and positioning a bag for stringing, a bag feeding carriage for feeding hemmed bags into the gripping means on said bag holder, and means movably mounted on the frame and movable relative to said bag holder for engaging with the bag gripped by said gripping means and turning said hemmed bags right side out on said bag holder preliminary to stringing the bag, said gripping means being rotatable about a vertical axis and being shorter than the bag is long.

17. A machine of the character described including a frame and comprising a bag holder having movable hem gripping means thereon adapted to grip the hems of a bag for supporting and positioning said bag for stringing; a bag feeding carriage for feeding hemmed bags into the gripping means on said bag holder, pivoted means on said frame engageable with said gripping means for moving the same to vertically closed gripping position on the bag hems, and means movably mounted on the frame and movable between said gripping means for engaging the bag gripped by said gripping means for turning said hemmed bags right side out on said bag holder preliminary to stringing the bag, said gripping means being rotatable about a vertical axis and being shorter than the bag is long.

18. A machine of the character described including a frame and comprising a bag holder having rotatable gripping means thereon for supporting and positioning a bag for stringing, a substantially horizontally disposed bag feeding carriage for feeding hemmed bags horizontally into the gripping means on said bag holder, and means movably mounted on the frame and movable between said gripping means and engageable with said gripped bag for turning said bag right side out on said bag holder preliminary to stringing the bag whereby the strings will be disposed on the outside of the bag, said gripping means being rotatable about a vertical axis and being shorter than the bag is long.

19. A machine of the character described including a frame and comprising a bag holder having movable bag gripping means thereon for supporting and positioning a bag for stringing, a horizontally disposed bag feeding carriage for horizontally feeding hemmed bags into the gripping means on said bag holder, and means pivotally mounted on said frame and arcuately movable between said movable gripping means and engageable with said substantially horizontally disposed bag for turning said bag right side out on the bag holder and moving said gripping means on said bag holder preliminary to stringing the bag.

20. A machine of the character described including a frame and comprising a rotatable bag holder having movable bag gripping means thereon for supporting and positioning a bag for stringing, a substantially horizontally disposed bag feeding carriage for horizontally feeding hemmed bags into the gripping means on said bag holder, an upstanding means pivotally mounted on said frame and having cam means thereon engageable with said gripping means for moving the same to grip the bag, and oscillating means pivoted to said frame and arcuately movable between said movable gripping means and engageable with said substantially horizontally disposed bag for turning said bag right side out on said bag holder preliminary to stringing the bag.

21. A machine of the character described comprising a bag holder having oppositely disposed pairs of gripping jaws thereon, one jaw of each pair being movable vertically and axially with respect to its companion jaw and both jaws of each pair being rotatable approximately 180 degrees about a vertical axis to a position within the hemmed mouth of a bag for supporting and positioning a bag for stringing, a substantially horizontally disposed bag supporting member, a substantially horizontally disposed bag feeding carriage associated with said bag supporting member, and means for reciprocating said carriage horizontally relative to said bag supporting member for feeding chain connected hemmed bags therealong, means for cutting the threads connecting said bags together, means associated with said carriage for opening the mouth of a bag, and means engageable with said opened bag for turnnig the same right side out on said bag holder while the bag is gripped by said gripping jaws and preliminary to stringing the same, said gripping jaws being shorter than the bag is long.

22. A machine of the character described including a frame and comprising a bag holder having movable bag gripping means thereon for gripping the hems of and supporting a bag for stringing, said gripping means being rotatable approximately 180 degrees to a position within the mouth of the hemmed bag to facilitate stringing, a substantially horizontally disposed bag supporting plate, a substantially horizontally disposed bag feeding carriage movably mounted on said plate and means for reciprocating said carriage relative to said plate for feeding chain connected hemmed bags therealong, means for cutting the threads connecting said bags together, means associated with said carriage engageable with the hems of a bag for opening the hemmed mouth of the bag, and a turning means movably mounted on said frame and movable relative to said gripping means for engaging with and turning said opened bag right side out on said bag holder preliminary to stringing the same and while said hem is gripped by said gripping means, and said gripping means being considerably shorter than the bag is long.

23. A machine of the character described including a frame and comprising a bag holder having substantially vertically movable bag gripping jaws thereon rotatable approximately 180 degrees about a vertical axis to a position within the mouth of the bag for supporting and positioning a hemmed bag for stringing, a substantially horizontally disposed feeding carriage for horizontally feeding hemmed bags into said gripping jaws, means for moving said gripping jaws into gripping position on the bag hems only, means associated with said carriage for opening the mouth of the bag, turning means movably mounted on said frame and movable into engagement with said bag for turning said bag right side out on said bag holder while the bag is gripped by said gripping jaws preliminary to stringing, a bag receiving receptacle, and means movably mounted on said frame for removing the strung bag from said bag holder gripping jaws and delivering the same directly into said receptacle.

24. A machine of the character described including a frame and comprising a bag holder having vertically movable bag gripping jaws thereon rotatable about a vertical axis approximately 180 degrees to a position within the mouth of a hemmed bag for supporting and positioning the bag for stringing, said bag gripping jaws being substantially shorter than the bag is long, a substantially horizontally disposed bag supporting member, a substantially horizontally disposed bag feeding carriage associated with said bag supporting member, and means for reciprocating said carriage horizontally relative to said bag supporting member for feeding chain connected hemmed bags therealong, means for cutting the threads connecting said bags together, means associated with said carriage for opening the mouth of a bag, and means movably mounted on the frame and engageable with said opened gripped bag for turning the same right side out on said bag holder while the bag is gripped by said gripping jaws and preliminary to stringing the same.

25. A method of stringing hemmed bags comprising feeding a bag in substantially a horizontal plane, gripping the hems only thereof, opening the mouth end of the bag, and engaging the bag and positively moving the closed end of the bag through the gripped and open hemmed mouth thereof for turning the bag right side out preliminary to stringing the same and simultaneously moving the gripped ends of the bag hems to a position within the mouth of the bag to facilitate stringing.

26. A method of stringing hemmed bags comprising feeding a bag in substantially a horizontal plane, gripping the ends only of the bag hems, opening the mouth end of the bag, and engaging the bag and rotating the gripped ends of the bag hems to a position within the mouth of the bag to facilitate stringing, and positively moving the closed end of the bag through the gripped and open mouth thereof for turning the bag right side out while the hems are being gripped and preliminary to stringing the same.

27. A machine for stringing bags having hems at their mouth ends comprising a bag stringing station at which strings are inserted through the hems, bag reversing means including a pair of rotatable grippers for gripping opposite ends only of said hems and supporting and turning the bags right side out preliminary to stringing, said grippers being rotatable to a position within the mouth of the bag for supporting successive bags in draw string threading position at said stringing station after reversal of the bags and preliminary to stringing, and means for feeding bags to said bag grippers.

28. A machine for stringing bags having hems at their mouth ends comprising a bag stringing station at which strings are inserted through the hems, bag reversing and supporting means for supporting and turning the bags right side out preliminary to stringing, said reversing means supporting successive bags in draw string threading position at said stringing station after reversal of the bags and preliminary to stringing and means for feeding bags to said bag reversing means.

29. A machine for stringing bags having hems at their mouth ends comprising a frame, hem gripping jaws mounted on said frame for supporting and positioning a bag for turning and stringing, means for feeding a hemmed bag to said gripping jaws, and means movably mounted on the frame and movable relative to the gripping jaws for slidably engaging the bag intermediate the hem and closed end thereof for moving the closed end through the open hemmed mouth for turning the bag right side out.

30. A machine of the character described including a frame and comprising a bag holder having gripping jaws thereon for supporting and positioning a stitched hemmed bag for stringing, a feed plate supported by the frame, means for feeding hemmed bags over said plate into the gripping jaws, said means comprising a plurality of reciprocable fingers entering beneath the hem and engaging the stitching thereof to properly align the bag with respect to said jaws, and means for reciprocating said fingers.

31. In a machine of the character described comprising bag holding means for supporting and positioning a stitched hemmed bag for turning and stringing, means for feeding a bag to said means and means associated with said feeding means entering beneath the hem of the bag and engaging the line of stitching thereof, to accurately align the bag hem with respect to said bag holding means.

32. In a machine for stringing hemmed bags, means for turning a hemmed bag right side out comprising a pair of swinging bag gripping and supporting jaws, said jaws being shorter than the bag is long and adapted to grip opposite ends of the hemmed portion only of the bag at the open end thereof, and means for swinging the jaws inwardly into the mouth of the bag thereby to carry the gripped ends therewith and to support the bag after being turned right side out and preliminary to stringing.

33. In a machine for stringing hemmed bags, means for turning a hemmed bag inside out comprising a pair of swinging bag gripping and supporting jaws adapted to grip opposite ends of the hemmed portion only of the bag at the open end thereof, and means for swinging the jaws inwardly into the mouth of the bag thereby to carry the gripped ends thereof, said last mentioned means cooperating with said gripping jaws and engaging the exterior of the bag for turning the bag inside out.

34. In a bag stringing machine, means for advancing successive hemmed bags to string threading position, reversing grippers at the draw string threading position adapted to support successive bags during the draw string threading operation, bag reversing means coacting with said grippers for reversing the successive bags, said grippers initially clamping the bags along the outer side margins thereof and being rotatable to retain their grasp on the bags during and after reversal of the bags.

35. In a bag stringing machine, means for advancing successive hemmed bags to string threading position, reversing grippers at the draw string threading position adapted to support successive bags during the draw string threading operation, bag reversing means coacting with the gripping means for reversing successive bags, said gripper means initially clamping a small area only of the bags along the outer side margins adjacent the open mouth thereof and being rotatable to retain their grasp on the bags during the after reversal of the bags.

36. In a bag stringing machine, means for supporting a reversed hemmed bag of greater length than width in stringing position with its side flaps and hemmed portions inside the bag, said supporting means comprising two pairs of rotatable side flap grippers, each pair of grippers engaging one side flap within the mouth of the bag and spaced sufficiently from the adjacent pair to permit of rotation of each pair of grippers 180° and to retain their grasp on said flaps during and after reversal of the bag.

37. In a bag stringing machine, means for supporting a reversed hemmed bag of greater length than width in stringing position with its side flaps and hemmed portions inside the bag, said supporting means comprising two pair of retatable side flap grippers, each pair of grippers engaging one side flap within the mouth of the bag and spaced sufficiently from the adjacent pair to permit of rotation of each pair of grippers 180° and to retain their grasp on said flaps during and after reversal of the bag, one jaw of each pair being movable axially to and from the gripping position with respect to its companion jaw.

EDWARD E. WEST.